United States Patent
Lee

(10) Patent No.: US 7,508,453 B2
(45) Date of Patent: Mar. 24, 2009

(54) SYNCHRONIZATION SIGNAL PROCESSOR

(75) Inventor: Janghwan Lee, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 567 days.

(21) Appl. No.: 10/512,359

(22) PCT Filed: Apr. 22, 2003

(86) PCT No.: PCT/US03/12569

§ 371 (c)(1),
(2), (4) Date: Oct. 25, 2004

(87) PCT Pub. No.: WO03/092162

PCT Pub. Date: Nov. 6, 2003

(65) Prior Publication Data

US 2005/0162553 A1    Jul. 28, 2005

Related U.S. Application Data

(60) Provisional application No. 60/375,504, filed on Apr. 25, 2002.

(51) Int. Cl.
*H04N 5/14* (2006.01)

(52) U.S. Cl. ............... 348/558; 348/500; 348/521; 348/525; 348/194

(58) Field of Classification Search ........... 348/180, 348/194, 500, 511–512, 516, 521, 524–525, 348/542, 545, 547–548, 536; *H04N 5/14*
See application file for complete search history.

(56) References Cited

U.S. PATENT DOCUMENTS

| 4,698,679 | A | 10/1987 | Balaban et al. | |
| 4,987,491 | A | 1/1991 | Kaite et al. | |
| 5,107,335 | A | 4/1992 | Nishiyama et al. | |
| 5,691,749 | A | 11/1997 | Sugiyama | |
| 5,736,873 | A | 4/1998 | Hwang | |
| 6,130,721 | A * | 10/2000 | Yoo et al. | 348/558 |
| 6,181,088 | B1 | 1/2001 | Gu | |
| 6,275,264 | B1 | 8/2001 | Kim | |
| 6,366,327 | B1 | 4/2002 | Renner et al. | |
| 6,421,092 | B1 | 7/2002 | Yui | |
| 6,606,410 | B2 | 8/2003 | Kim | |
| 6,720,946 | B2 * | 4/2004 | Matsumura | 345/87 |
| 6,801,246 | B2 * | 10/2004 | Horlander | 348/194 |
| 6,822,660 | B2 * | 11/2004 | Kim | 345/699 |

(Continued)

FOREIGN PATENT DOCUMENTS

JP    6-22346    1/1994

(Continued)

OTHER PUBLICATIONS

Search Report Dated Jun. 26, 2003.

(Continued)

*Primary Examiner*—Trang U Tran
(74) *Attorney, Agent, or Firm*—Robert D. Shedd

(57) ABSTRACT

A video data stream containing picture video and a vertical synchronization signal is processed in a microprocess that performs statistical evaluation of the frequency of the vertical synchronization signal of the video data stream. The statistical evaluation includes producing the statistical mean value and variance of the frequency of the vertical synchronization signal.

7 Claims, 3 Drawing Sheets

U.S. PATENT DOCUMENTS

| | | |
|---|---|---|
| 6,927,746 B2 * | 8/2005 | Lee et al. .................. 345/3.2 |
| 2002/0118045 A1 | 8/2002 | Horlander |
| 2002/0145597 A1 | 10/2002 | Kim |

FOREIGN PATENT DOCUMENTS

| JP | 10-097214 | 4/1998 |
|---|---|---|
| JP | 10-191096 | 7/1998 |
| JP | 10-215435 | 8/1998 |
| JP | 2000-276092 | 10/2000 |

OTHER PUBLICATIONS

Translation will follow.

* cited by examiner

US 7,508,453 B2

SYNCHRONIZATION SIGNAL PROCESSOR

This application claims the benefit, under 35 U.S.C. § 365 of International Application PCT/US03/12569, filed Apr. 22, 2003, which was published in accordance with PCT Article 21(2) on Nov. 6, 2003 in English and which claims the benefit of U.S. Provisional Patent Application No. 60/375,504, filed Apr. 25, 2002.

FIELD OF THE INVENTION

This invention relates to a synchronization signal processing arrangement in a video display apparatus.

BACKGROUND OF THE INVENTION

A typical television receiver includes a detector for producing from an input signal an analog, base-band television signal in accordance with the standard used. The analog, base-band television signal includes a horizontal synchronization signal, a vertical synchronization signal and a video portion signal. In a digital television receiver, the base-band television signal is applied to a digital signal processor for producing a video data stream in accordance with, for example, the BT 656 standard. The video data stream includes a corresponding vertical synchronization signal.

When the input signal is absent or too weak, the video data stream will contain invalid data. It may be desirable to detect whether the input signal is absent or too weak. For example, when the input signal is absent or too weak, the detection can be used for blanking the display screen and displaying a banner for the user that indicates absent or too weak input signal.

In carrying out an inventive feature, the video data stream is processed in a microprocessor that performs statistical evaluation of the frequency of the vertical synchronization signal of the video data stream. The statistical evaluation includes computing the statistical mean value and variance of the frequency of the vertical synchronization signal.

SUMMARY OF THE INVENTION

A video display apparatus, embodying an inventive feature, includes a source of a periodic synchronization signal for synchronizing an operation of a display device responsive to an accompanying video signal that provides picture information. A utilization circuit operates in a normal operation mode, when the synchronization signal is valid, and in a second operation mode, when the synchronization signal is invalid. A processor is responsive to the synchronization signal and coupled to the utilization circuit for producing a value indicative of a statistical variance of a frequency of the synchronization signal to change the mode of operation of the utilization circuit from the normal operation mode to the second operation mode, when the statistical variance exceeds a first threshold value.

DESCRIPTION OF THE INVENTION

Figure 1:
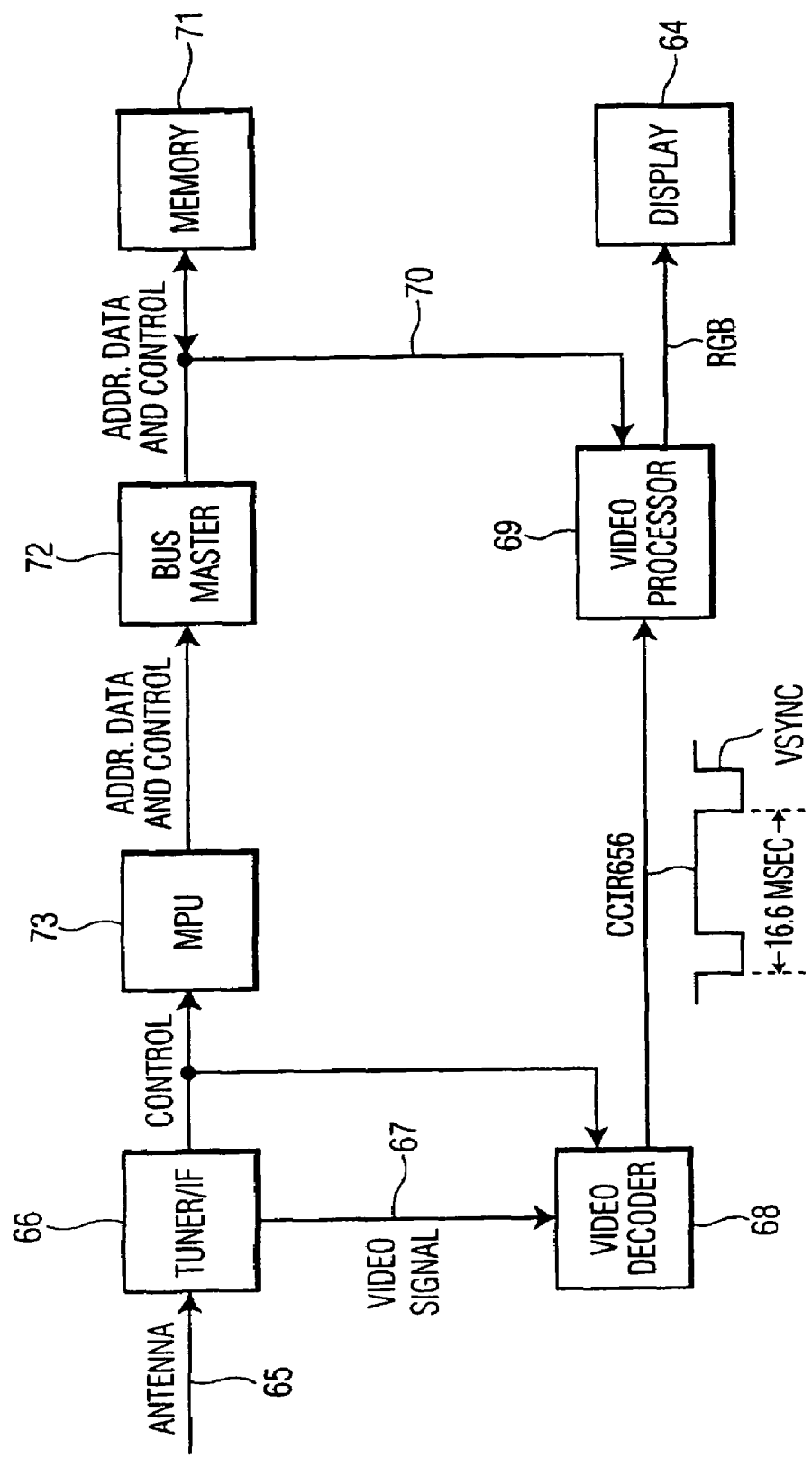
FIG. 1 illustrates a block diagram of a digital television receiver, embodying an inventive feature.

FIG. 1 illustrates a block diagram of a digital television receiver, embodying an inventive feature. A conventional Tuner/IF stage 66 includes a detector, not shown, for producing from a radio frequency (RF) input signal 65 that is coupled via an antenna, not shown, an analog, base-band video signal 67 in accordance with the standard used, for example, the standard in the United States known as NTSC. Base-band video signal 67 is applied to a video decoder 68 for producing, in a conventional manner, a video data stream CCIR 656. Video data stream CCIR 656 is produced, in accordance with, for example, the BT 656 standard, in a conventional manner. Video decoder 68 may include an integrated circuit (IC), for example, ADV7185 or BT819. Video data stream CCIR 656 is coupled to a video processor 69 that may include an IC TL851 for generating, for example, a Red, Green and Blue (R, G, B) video signal RGB that is coupled to a display 64 having a display screen, not shown.

Video data stream CCIR 656 includes a horizontal synchronization signal, a vertical synchronization signal VSYNC, shown schematically in FIG. 1, and a video portion signal, not shown. Video processor 69 also generates, in a conventional manner, a program interrupt signal, not shown, that is coupled to a microprocessor unit 73 via an internal bus 70 and a bus master 72 operating as a bus bridge, each time vertical synchronization signal VSYNC occurs. A memory 71 is shared by microprocessor unit 73 and video processor 69.

Figure 2:
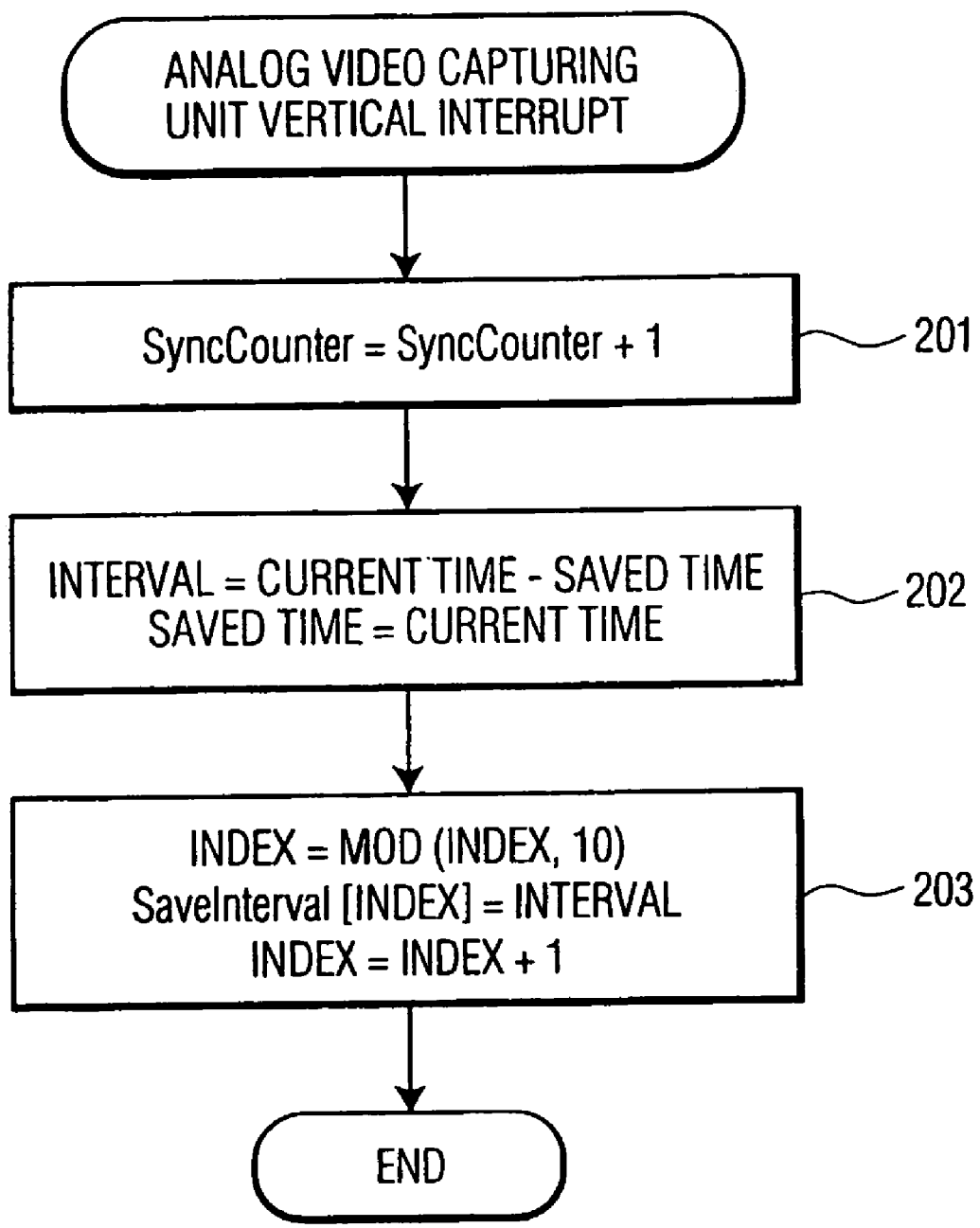
FIG. 2 illustrates a flow chart of a first portion of a routine performed in the arrangement of FIG. 1.

FIG. 2 illustrates a flow chart of a first portion of a routine performed in each time vertical synchronization signal VSYNC occurs in video stream CCIR 656 of FIG. 1. Similar symbols and numerals in FIGS. 1 and 2 indicate similar items or functions. The routine of FIG. 1 is initiated in microprocessor unit 73 via, for example, the aforementioned program interrupt signal.

In the first portion of the routine of FIG. 2 performed in microprocessor unit 73 of FIG. 1, a word SyncCounter of FIG. 2 for counting the occurrences of vertical synchronization signal VSYNC in a predetermined interval such as, for example, a 1-second interval is incremented each time vertical synchronization signal VSYNC occurs, as shown in a step 201. Additionally, the length of an interval INTERVAL that has elapsed from the immediately preceding occurrence of vertical synchronization signal VSYNC, as shown in a step 202, is measured and stored in a corresponding word SaveInterval [Index] and an index word Index is incremented, as shown in a step 203. The lengths of, for example, only the last 10 timing intervals INTERVAL contained in words, SaveInterval [1]-SaveInterval [10], are available for further processing by microprocessor unit 73 of FIG. 1. This is implemented by performing the operation, Index=mod (Index, 10), as shown in a step 203 of FIG. 2, where the term mod(Index, 10) refers to 10 modular operation.

Figure 3:
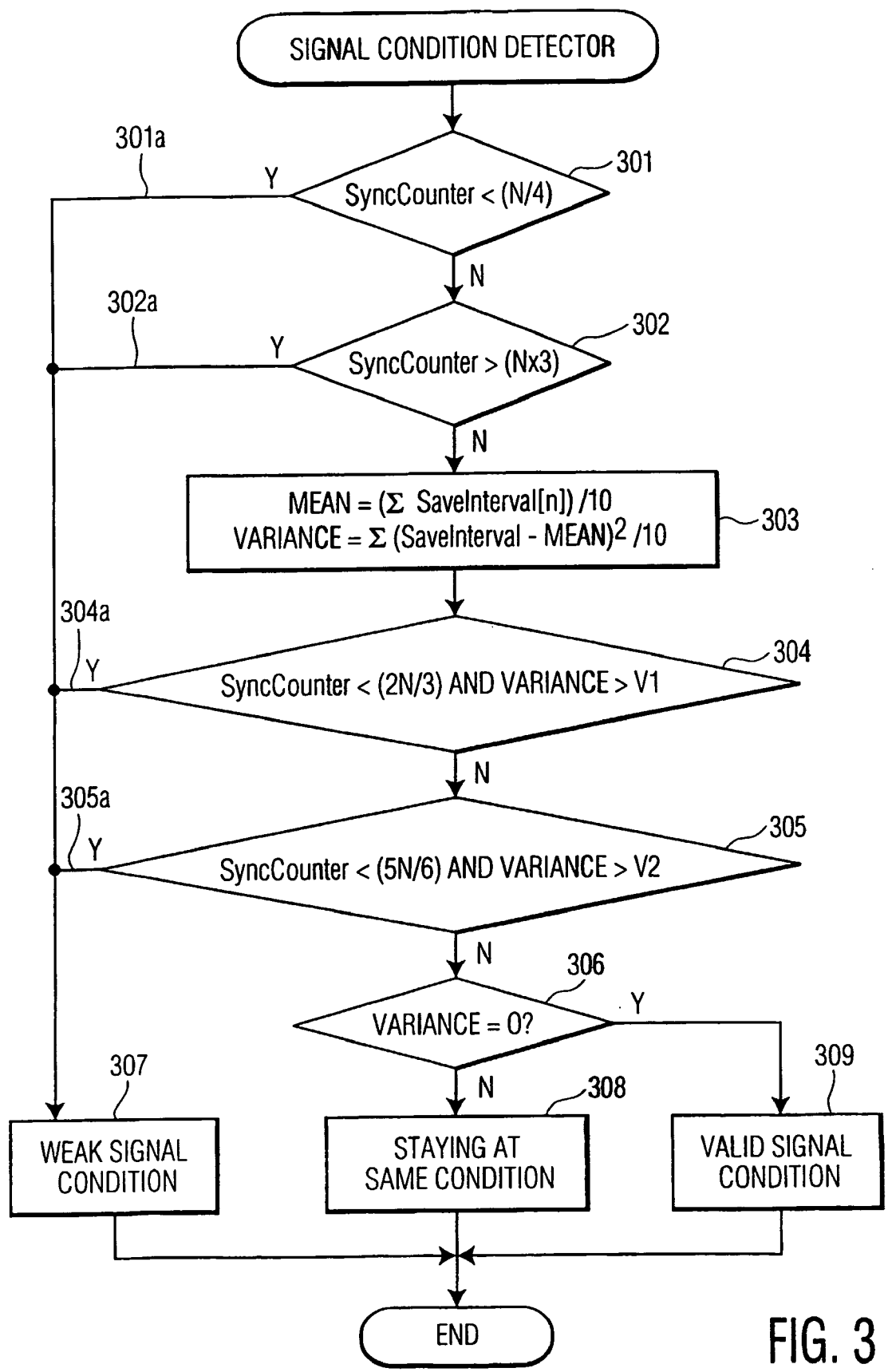
FIG. 3 illustrates a flow chart of a second portion of the routine performed in the arrangement of FIG. 1.

FIG. 3 illustrates a flow chart of a second portion of the routine performed in microprocessor unit 73 of FIG. 1, at the end of the aforementioned 1-second interval. Similar symbols and numerals in FIGS. 1, 2 and 3 indicate similar items or functions. As a result of the operations performed in the routine of FIG. 2, word SyncCounter of FIG. 2 contains the number of occurrences of vertical synchronization signal VSYNC, during the immediately preceding 1-second interval. Thus, word SyncCounter is indicative of the frequency of vertical synchronization signal VSYNC.

Word SyncCounter of FIG. 3 is compared to a value equal to one quarter of a value N or N/4, where "N" is the expected value of word SyncCounter when the frequency of vertical synchronization signal VSYNC is equal to the expected frequency, as shown in a step 301. Value N that is determined by the expected frequency of the input signal may be different for different modes of operation. For example, when the expected frequency of vertical synchronization signal VSYNC is 30 Hz, the value of N for the aforementioned 1-second interval is equal to, for example, 30.

Similarly, word SyncCounter is also compared to a value equal to 3 times N or 3N, as shown in a step 302. If the value of word SyncCounter is outside the range, (N/4<word SyncCounter<3N), the frequency of vertical synchronization signal VSYNC is considered to be outside an acceptable range and the input signal is deemed to be absent or too weak, as shown in a state 307 via a path 301a and via a path 302a. If the value of word SyncCounter is within the range, (N/4<word SyncCounter<3N), microprocessor unit 73 performs statistical evaluation of the frequency of vertical synchronization signal VSYNC, as follows.

For saving computing power and time, only, for example, the last 10 timing intervals contained in words, SaveInterval [1]-SaveInterval [10], are used for computing a mean value MEAN and a variance value VARIANCE of the period of vertical synchronization signal VSYNC, as shown in a step 303.

In carrying out an inventive feature, value VARIANCE is indicative of the extent of fluctuation of the frequency of sync signal VSYNC from the average frequency of sync signal VSYNC. Thereby, value VARIANCE is indicative of the stability of signal VSYNC. A larger value of value VARIANCE is indicative of a less stable frequency.

Word SyncCounter is compared to a value equal to 2N/3, as shown in a step 304. If both the value of word SyncCounter is smaller than 2N/3 and computed value VARIANCE is greater than a threshold value equal to V1, for example, 500, then signal VSYNC is deemed to be absent or too weak, as shown in state 307 via a path 304a. Similarly, word SyncCounter is compared to a value equal to 5N/6, as shown in a step 305. If both the value of word SyncCounter is smaller than 5N/6 and value VARIANCE is greater than a threshold value equal to V2, for example, 1500, then signal VSYNC is also deemed to be absent or too weak, as shown in state 307 via a path 305a. Thus, in step 304, in which a larger frequency deviation occurs from the expected frequency than in step 305, a smaller value of variance VARIANCE than in step 305 will result in a determination that signal VSYNC is invalid. When signal VSYNC is deemed to be absent or too weak, the invalidity determination is used, for example, for blanking a displayed picture on display screen, not shown, in display 64 of FIG. 1 and for displaying, instead, a banner for the user that indicates absent or too weak signal VSYNC.

As shown in a step 306, the last step in the routine, the value VARIANCE is tested by itself. If the value VARIANCE is equal to zero, that is indicative of a highly stable frequency of vertical synchronization signal VSYNC, the signal VSYNC is deemed to be valid, as shown in a state 309. Otherwise, as shown in a state 308, the most recently made determination, either that signal VSYNC is deemed to be valid or invalid, is maintained unchanged.

Thus, in carrying out another inventive feature, microprocessor unit 73 changes to a validity determination in step 306 the invalidity determination obtained formerly in one of steps 301, 302, 304 or 305, when value VARIANCE produced presently is lower than any of threshold values V1 and V2 in a manner to provide hysteresis. For example, a less than a significant deterioration of the frequency stability of signal VSYNC will not change a prior determination that signal VSYNC is valid. On the other hand, signal VSYNC having less than a highly stable frequency will not change a prior determination that signal VSYNC is invalid.

Advantageously, the determination that signal VSYNC is deemed to be valid does not necessitate its frequency to be exactly equal to the expected frequency. Therefore, the determination will be valid even with respect to signal VSYNC produced in a video recorder operating in, for example, a fast forward mode having a frequency that deviates somewhat from the expected frequency.

What is claimed is:

1. A video display apparatus, comprising:
a source of a periodic synchronization signal for synchronizing an operation of a display device responsive to an accompanying video signal that provides picture information;
a utilization circuit operating in a normal operation mode, when said synchronization signal is valid, and in a second operation mode, when said synchronization signal is invalid; and
a processor responsive to said synchronization signal and coupled to said utilization circuit for producing a plurality of values corresponding to successive occurrences of said synchronization signal, a given value of said plurality of values being indicative of a length of an interval that has elapsed from a preceding occurrence of said synchronization signal, and wherein said processor produces a statistical variance indicative value in accordance with a difference between said given value of said plurality of values and a mean value of said plurality of values, wherein said value indicative of a statistical variance of a frequency of said synchronization signal indicates to change the mode of operation of said utilization circuit from said normal operation mode to said second operation mode, when the statistical variance exceeds a first threshold value.

2. The video display apparatus according to claim 1 wherein said processor counts a number of occurrences of said synchronization signal, during a first interval, and wherein, when the counted number of occurrences is outside a normal operation range of values, the mode of operation of said utilization circuit changes from said normal operation mode to said second operation mode, regardless of said statistical variance indicative value.

3. The video display apparatus according to claim 2 wherein said normal operation range of values of the counted number of occurrences extends between a lower limit and an upper limit.

4. The video display apparatus according to claim 1 wherein said processor produces a first plurality of values corresponding to successive occurrences of said synchronization signal, a given value of said first plurality of values being indicative of a length of an interval that has elapsed from a preceding occurrence of said synchronization signal, and wherein said processor produces said statistical variance indicative value from a second plurality of values, a given value of said second plurality of values being produced in accordance with a square of a difference between a corresponding value of said first plurality of values and a mean value of said first plurality of values.

5. The video display apparatus according to claim 1 wherein said processor counts a number of occurrences of said synchronization signal, during a first interval, and wherein said first threshold value is selected dynamically, in accordance with said number of occurrences.

6. The video display apparatus according to claim 5 wherein, when a deviation of said number of occurrences from an expected value is larger, said selected first threshold value is smaller, and when said deviation is smaller, said selected first threshold value is larger.

7. The video display apparatus according to claim 1 wherein, when said utilization circuit operates in said second mode of operation and the statistical variance is smaller than a second threshold value, operation in said normal operation mode begins and when the statistical variance is smaller than said first threshold value and larger than said second threshold value, the operation in said normal operation mode continues.

* * * * *